(12) United States Patent
Agarwal et al.

(10) Patent No.: US 7,512,585 B2
(45) Date of Patent: Mar. 31, 2009

(54) SUPPORT FOR MULTIPLE MECHANISMS FOR ACCESSING DATA STORES

(75) Inventors: Sachin Agarwal, Santa Clara, CA (US); Lakshmi V. Thiyagarajan, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 602 days.

(21) Appl. No.: 10/314,888

(22) Filed: Dec. 9, 2002

(65) Prior Publication Data

US 2004/0024762 A1    Feb. 5, 2004

Related U.S. Application Data

(60) Provisional application No. 60/395,152, filed on Jul. 11, 2002.

(51) Int. Cl.
*G06F 7/00* (2006.01)
*G06F 17/30* (2006.01)

(52) U.S. Cl. .......................... 707/1; 707/200; 707/205; 707/10; 705/39

(58) Field of Classification Search ............. 705/39, 705/36; 713/201; 707/200, 10, 3, 203; 726/12; 709/220

See application file for complete search history.

(56) References Cited

U.S. PATENT DOCUMENTS

| | | |
|---|---|---|
| 5,010,478 A | 4/1991 | Deran |
| 5,077,666 A | 12/1991 | Brimm et al. |
| 5,455,953 A | 10/1995 | Russell |
| 5,499,371 A | 3/1996 | Henninger et al. |
| 5,530,861 A | 6/1996 | Diamant et al. |
| 5,581,691 A | 12/1996 | Hsu et al. |
| 5,596,746 A | 1/1997 | Shen et al. |
| 5,664,154 A | 9/1997 | Purcell et al. |
| 5,678,041 A | 10/1997 | Baker et al. |
| 5,692,125 A | 11/1997 | Schloss et al. |
| 5,694,598 A | 12/1997 | Durand et al. |
| 5,708,780 A | 1/1998 | Levergood et al. |
| 5,713,023 A * | 1/1998 | Hayata et al. ............... 707/200 |
| 5,721,900 A | 2/1998 | Banning et al. |
| 5,724,595 A | 3/1998 | Gentner |

(Continued)

OTHER PUBLICATIONS

U.S. Appl. No. 10/327,607, Notice of Allowance dated Aug. 6, 2008, 36 pages.

(Continued)

*Primary Examiner*—John E Breene
*Assistant Examiner*—Giovanna Colan
(74) *Attorney, Agent, or Firm*—Townsend and Townsend and Crew LLP

(57) ABSTRACT

Technology is disclosed for supporting the use of multiple access mechanisms for accessing one or more data stores. Examples of access mechanisms include the LDAP protocol and the ADSI protocol. One embodiment of the present invention includes maintaining an association of access mechanisms to types of data store operations such that two or more types of data store operations for a first data store can be associated with different access mechanisms. The system receives a first operation for the first data store, where the first operation is of a first type of data store operation. The system accesses the first data store to perform the first operation using an access mechanism associated with the first type of data store operation.

48 Claims, 8 Drawing Sheets

U.S. PATENT DOCUMENTS

| | | | |
|---|---|---|---|
| 5,732,408 A | 3/1998 | Takahashi | |
| 5,754,939 A | 5/1998 | Herz et al. | |
| 5,764,890 A | 6/1998 | Glasser et al. | |
| 5,815,703 A | 9/1998 | Copeland et al. | |
| 5,848,273 A | 12/1998 | Fontana et al. | |
| 5,878,411 A | 3/1999 | Burroughs et al. | |
| 5,944,824 A | 8/1999 | He | |
| 5,991,810 A | 11/1999 | Shapiro et al. | |
| 5,999,911 A | 12/1999 | Berg et al. | |
| 6,014,666 A | 1/2000 | Helland et al. | |
| 6,044,465 A | 3/2000 | Dutcher et al. | |
| 6,073,109 A | 6/2000 | Flores et al. | |
| 6,078,747 A | 6/2000 | Jewitt | |
| 6,098,056 A | 8/2000 | Rusnak et al. | |
| 6,131,120 A | 10/2000 | Reid | |
| 6,134,634 A | 10/2000 | Marshall, Jr. et al. | |
| 6,138,104 A | 10/2000 | Marchak et al. | |
| 6,141,778 A | 10/2000 | Kane et al. | |
| 6,145,003 A | 11/2000 | Sanu et al. | |
| 6,151,531 A | 11/2000 | Frankel et al. | |
| 6,158,010 A | 12/2000 | Moriconi et al. | |
| 6,163,781 A | 12/2000 | Wess, Jr. | |
| 6,182,142 B1 | 1/2001 | Win et al. | |
| 6,195,710 B1 | 2/2001 | Borgendale et al. | |
| 6,208,986 B1 | 3/2001 | Schneck et al. | |
| 6,212,558 B1 | 4/2001 | Antur et al. | |
| 6,253,202 B1 | 6/2001 | Gilmour | |
| 6,253,239 B1 | 6/2001 | Shklar et al. | |
| 6,253,257 B1 | 6/2001 | Dundon | |
| 6,256,737 B1 | 7/2001 | Bianco et al. | |
| 6,256,739 B1 | 7/2001 | Skopp et al. | |
| 6,256,773 B1 * | 7/2001 | Bowman-Amuah | 717/121 |
| 6,260,077 B1 | 7/2001 | Rangarajan et al. | |
| 6,266,420 B1 | 7/2001 | Langford et al. | |
| 6,278,993 B1 | 8/2001 | Kumar et al. | |
| 6,279,043 B1 | 8/2001 | Hayward et al. | |
| 6,314,470 B1 | 11/2001 | Ward et al. | |
| 6,323,881 B1 | 11/2001 | Broulik | |
| 6,335,927 B1 | 1/2002 | Elliott et al. | |
| 6,338,097 B1 | 1/2002 | Krenzke et al. | |
| 6,343,287 B1 | 1/2002 | Kumar et al. | |
| 6,347,312 B1 | 2/2002 | Byrne et al. | |
| 6,349,306 B1 | 2/2002 | Malik et al. | |
| 6,353,929 B1 | 3/2002 | Houston | |
| 6,366,913 B1 | 4/2002 | Fitler, Jr. et al. | |
| 6,366,987 B1 | 4/2002 | Tzeinic et al. | |
| 6,401,101 B1 | 6/2002 | Britton et al. | |
| 6,401,138 B1 | 6/2002 | Judge et al. | |
| 6,415,368 B1 | 7/2002 | Glance et al. | |
| 6,434,531 B1 | 8/2002 | Lancelot et al. | |
| 6,442,567 B1 | 8/2002 | Retallick et al. | |
| 6,490,655 B1 | 12/2002 | Kershaw | |
| 6,499,023 B1 | 12/2002 | Dong et al. | |
| 6,523,022 B1 | 2/2003 | Hobbs | |
| 6,529,941 B2 | 3/2003 | Haley et al. | |
| 6,539,379 B1 | 3/2003 | Vora et al. | |
| 6,549,941 B1 | 4/2003 | Jaquith et al. | |
| 6,611,840 B1 | 8/2003 | Baer et al. | |
| 6,647,383 B1 | 11/2003 | August et al. | |
| 6,671,695 B2 | 12/2003 | McFadden | |
| 6,671,745 B1 | 12/2003 | Mathur et al. | |
| 6,701,368 B1 | 3/2004 | Chennapragada et al. | |
| 6,704,807 B1 | 3/2004 | Mathur et al. | |
| 6,704,873 B1 * | 3/2004 | Underwood | 726/12 |
| 6,708,170 B1 | 3/2004 | Byrne et al. | |
| 6,721,804 B1 | 4/2004 | Rubin et al. | |
| 6,732,178 B1 | 5/2004 | Van Horne et al. | |
| 6,732,179 B1 | 5/2004 | Brown et al. | |
| 6,741,853 B1 | 5/2004 | Jiang et al. | |
| 6,757,720 B1 * | 6/2004 | Weschler, Jr. | 709/220 |
| 6,760,750 B1 | 7/2004 | Boneh et al. | |
| 6,768,988 B2 | 7/2004 | Boreham et al. | |
| 6,769,000 B1 | 7/2004 | Akhtar et al. | |
| 6,785,686 B2 | 8/2004 | Boreham et al. | |
| 6,785,713 B1 | 8/2004 | Freeman et al. | |
| 6,785,726 B1 | 8/2004 | Freeman et al. | |
| 6,839,701 B1 | 1/2005 | Baer et al. | |
| 6,880,086 B2 | 4/2005 | Kidder et al. | |
| 6,948,135 B1 | 9/2005 | Ruthfield et al. | |
| 6,954,792 B2 * | 10/2005 | Kang et al. | 709/229 |
| 6,968,364 B1 * | 11/2005 | Wong et al. | 709/217 |
| 6,985,912 B2 | 1/2006 | Mullins et al. | |
| 6,999,956 B2 | 2/2006 | Mullins | |
| 7,013,435 B2 | 3/2006 | Gallo et al. | |
| 7,013,469 B2 | 3/2006 | Smith et al. | |
| 7,035,926 B1 | 4/2006 | Cohen et al. | |
| 7,039,871 B2 | 5/2006 | Cronk | |
| 7,069,330 B1 | 6/2006 | McArdle et al. | |
| 7,076,784 B1 | 7/2006 | Russell et al. | |
| 7,114,037 B2 | 9/2006 | Agarwal et al. | |
| 7,120,914 B1 | 10/2006 | Manthos et al. | |
| 7,213,249 B2 | 5/2007 | Loo et al. | |
| 7,216,163 B2 | 5/2007 | Sinn | |
| 7,231,661 B1 | 6/2007 | Villavicencio | |
| 7,249,369 B2 | 7/2007 | Knouse | |
| 7,266,595 B1 | 9/2007 | Black et al. | |
| 7,340,447 B2 | 3/2008 | Ghatare | |
| 7,349,912 B2 | 3/2008 | Delany et al. | |
| 7,363,339 B2 | 4/2008 | Delany et al. | |
| 7,380,008 B2 | 5/2008 | Teng et al. | |
| 7,398,311 B2 | 7/2008 | Joshi et al. | |
| 2002/0032684 A1 | 3/2002 | Kobayashi et al. | |
| 2002/0038306 A1 | 3/2002 | Griffin et al. | |
| 2002/0049749 A1 | 4/2002 | Helgeson et al. | |
| 2002/0067370 A1 | 6/2002 | Forney et al. | |
| 2002/0073180 A1 | 6/2002 | Dewhurst et al. | |
| 2002/0083178 A1 | 6/2002 | Brothers | |
| 2002/0138763 A1 | 9/2002 | Delany et al. | |
| 2002/0143943 A1 * | 10/2002 | Lee et al. | 709/225 |
| 2002/0161766 A1 | 10/2002 | Lawson et al. | |
| 2003/0018910 A1 * | 1/2003 | Wert et al. | 713/200 |
| 2003/0028752 A1 | 2/2003 | Fu et al. | |
| 2003/0037052 A1 | 2/2003 | Kitain et al. | |
| 2003/0046266 A1 | 3/2003 | Mullins et al. | |
| 2003/0055762 A1 | 3/2003 | Holt | |
| 2003/0055806 A1 | 3/2003 | Wong et al. | |
| 2003/0065558 A1 | 4/2003 | Shaw et al. | |
| 2003/0083908 A1 | 5/2003 | Steinmann | |
| 2003/0088708 A1 | 5/2003 | Lewallen | |
| 2003/0097380 A1 | 5/2003 | Mulhern et al. | |
| 2003/0105733 A1 | 6/2003 | Boreham et al. | |
| 2003/0105742 A1 | 6/2003 | Boreham et al. | |
| 2003/0115196 A1 | 6/2003 | Boreham et al. | |
| 2003/0115548 A1 | 6/2003 | Melgar | |
| 2003/0120593 A1 * | 6/2003 | Bansal et al. | 705/39 |
| 2003/0120601 A1 | 6/2003 | Ouye et al. | |
| 2003/0144982 A1 | 7/2003 | Reulein et al. | |
| 2003/0145074 A1 | 7/2003 | Penick | |
| 2003/0204481 A1 | 10/2003 | Lau | |
| 2003/0208397 A1 | 11/2003 | VanDusen | |
| 2003/0217127 A1 | 11/2003 | Sinn | |
| 2003/0217333 A1 | 11/2003 | Smith et al. | |
| 2004/0003351 A1 | 1/2004 | Sommerer et al. | |
| 2005/0240490 A1 | 10/2005 | Mackey | |

OTHER PUBLICATIONS

U.S. Appl. No. 10/354,913, Notice of Allowance dated Jun. 12, 2008, 8 pages.
U.S. Appl. No. 10/952,592, Final Office Action dated May 3, 2007, 54 pages.
U.S. Appl. No. 11/684,796, Advisory Action dated Aug. 13, 2008, 4 pages.
Saba—Products, Saba Enterprise 5, dated 1997-2006, 2 pages.

Saba—Company, dated 1997-2006, 1 page.
Saba—Solutions, Competency-Driven HCM, dated 1997-2006, 1 page.
Saba—Talent, dated 1997-2006, 2 pages.
Saba—Collaboration, dated 1997-2006, 1 page.
U.S. Appl. No. 10/327,607, Office Action dated Feb. 13, 2006, 5 pages.
U.S. Appl. No. 10/327,607, Office Action dated Apr. 18, 2006, 33 pages.
U.S. Appl. No. 10/328,920, Office Action dated May 31, 2006, 20 pages.
U.S. Appl. 10/345,873, Office Action dated Sep. 9, 2005, 13 pages.
U.S. Appl. No. 10/345,873, Office Action dated Mar. 10, 2006, 7 pages.
U.S. Appl. No. 10/354,913, Office Action dated Sep. 9, 2003, 19 pages.
U.S. Appl. No. 10/354,913, Final Office Action dated Apr. 6, 2004, 22 pages.
U.S. Appl. No. 10/354,913, Office Action dated Apr. 15, 2005, 20 pages.
U.S. Appl. No. 10/354,913, Final Office Action dated Dec. 5, 2005, 15 pages.
U.S. Appl. No. 10/354,913, Office Action dated May 12, 2005, 16 pages.
U.S. Appl. No. 10/354,914, Office Action dated Aug. 1, 2005, 15 pages.
U.S. Appl. No. 10/354,914, Final Office Action dated Feb. 10, 2006, 16 pages.
U.S. Appl. No. 10/325,465, Final Office Action dated Apr. 4, 2007, 25 pages.
U.S. Appl. No. 10/325,465, Advisory Action dated Jun. 19, 2007, 3 pages.
U.S. Appl. No. 10/325,465, Office Action dated Dec. 12, 2007, 20 pages.
U.S. Appl. No. 10/327,607, Final Office Action dated Oct. 10, 2006, 33 pages.
U.S. Appl. No. 10/327,607, Office Action dated Apr. 30, 2007, 31 pages.
U.S. Appl. No. 10/327,607, Final Office Action dated Nov. 16, 2007, 35 pages.
U.S. Appl. No. 10/327,607, Advisory Action dated Feb. 4, 2008, 3 pages.
U.S. Appl. No. 10/328,920, Notice of Allowance dated Dec. 5, 2006, 8 pages.
U.S. Appl. No. 10/345,873, Notice of Allowance dated Jul. 6, 2006, 6 pages.
U.S. Appl. No. 10/345,879, Final Office Action dated May 17, 2007, 39 pages.
U.S. Appl. No. 10/345,879, Advisory Action dated Jul. 27, 2007, 5 pages.
U.S. Appl. No. 10/345,879, Office Action dated Oct. 31, 2007, 35 pages.
U.S. Appl. No. 10/354,914, Office Action dated Sep. 22, 2006, 8 pages.
U.S. Appl. No. 10/354,914, Final Office Action dated Apr. 5, 2007, 9 pages.
U.S. Appl. No. 11/684,796, Office Action dated Nov. 27, 2007, 25 pages.
U.S. Appl. No. 10/354,913, Final Office Action dated Oct. 31, 2006, 15 pages.
U.S. Appl. No. 10/354,913, Final Office Action dated Apr. 18, 2007, 20 pages.
U.S. Appl. No. 10/354,913, Ex Parte Quayle Action dated Nov. 1, 2007, 7 pages.
U.S. Appl. No. 10/354,913, Office Action dated Feb. 7, 2008, 10 pages.
U.S. Appl. No. 10/354,914, Final Office Action dated Apr. 5, 2007, 9 pages.
U.S. Appl. No. 10/354,914, Notice of Allowance dated Mar. 12, 2008, 11 pages.
U.S. Appl. No. 10/354,914, Office Action dated Sep. 22, 2006, 8 pages.
U.S. Appl. No. 11/684,796, Office Action dated Nov. 27, 2007, 25 pages.
U.S. Appl. No. 10/325,465.
U.S. Appl. No. 10/327,607.
U.S. Appl. No. 10/345,879.
U.S. Appl. No. 10/354,914.
U.S. Appl. No. 11/684,796.
U.S. Appl. No. 10/354,913.
U.S. Appl. No. 10/328,920. now U.S. Patent No. 7,026,851.
U.S. Appl. No. 10/345,873, now U.S. Patent No. 7,114,037.
U.S. Appl. No. 10/325,438.
Kim, K.H., "APIs for Real-Time Diistributed Object Programming", Coputer, IEEE 2000, June, pp. 72-80.
McLellan, et al., "Building More Usable APIs", IEEE Software, pp. 78-86, May/Jun. 1998.
Stets, et al., "Component-Based APIs for Versioning and Distributed Applications", IEEE, pp. 54-61, 1999.
U.S. Appl. No. 09/570,276, Office Action dated Nov. 14, 2006, 28 pages.
U.S. Appl. No. 10/325,465, Office Action dated Sep. 19, 2006, 25 pages.
U.S. Appl. No. 10/345,879, Office Action dated Oct. 5, 2006, 30 pages.
U.S. Appl. No. 11/684,796, Office Action dated Nov. 27, 2007, 25 pages.
U.S. Appl. No. 11/684,796, Final Office Action dated Jun. 17, 2008, 22 pages.
SiteMinder Installation Guide, Version 4.0, Netegrity Inc., 1997.
Leon, McAfee's NetTools Promises to Ease Network Desktop Diagnosis, InfoWorld, San Mateo, Jul. 24, 1995, vol. 17, Iss. 30, p. 53.
Cooney, IBM rolls out host- and server-based mgmt. apps, Network World, Framingham, Feb. 6, 1995, vol. 12, Iss. 6, pp. 6-7.
Walsh, Remedy releases three applications for help-desk suite, InfoWorld, San Mateo, Apr. 21, 1997, vol. 19, Iss. 16, p. 34.
Schmersal, Testing to maintain service standards, Communications News, Nokomis, Mar. 1998, vol. 35, Iss. 3, pp. 22-23.
Musthaler, The trouble with help desk selection, Network World, Framingham, Feb. 20, 1995, vol. 12, Iss. 8, pp. 35-39.
Clear Trust, Unified Access Management, Securant Technologies, Inc., pp. 1-23, 1997.
SiteMinder Agent Operations, Verson 4.0, Netegrity Inc., 1997.
SiteMinder Deployment Guide, Version 4.0, Netegrity Inc., 1997.
SiteMinder Policy Server Operations Guide, Version 4.0, Netegrity Inc., 1997.
SiteMinder Developer's API Guide, Version 4.0, Netegrity Inc., 1997.

* cited by examiner

FIG. 3
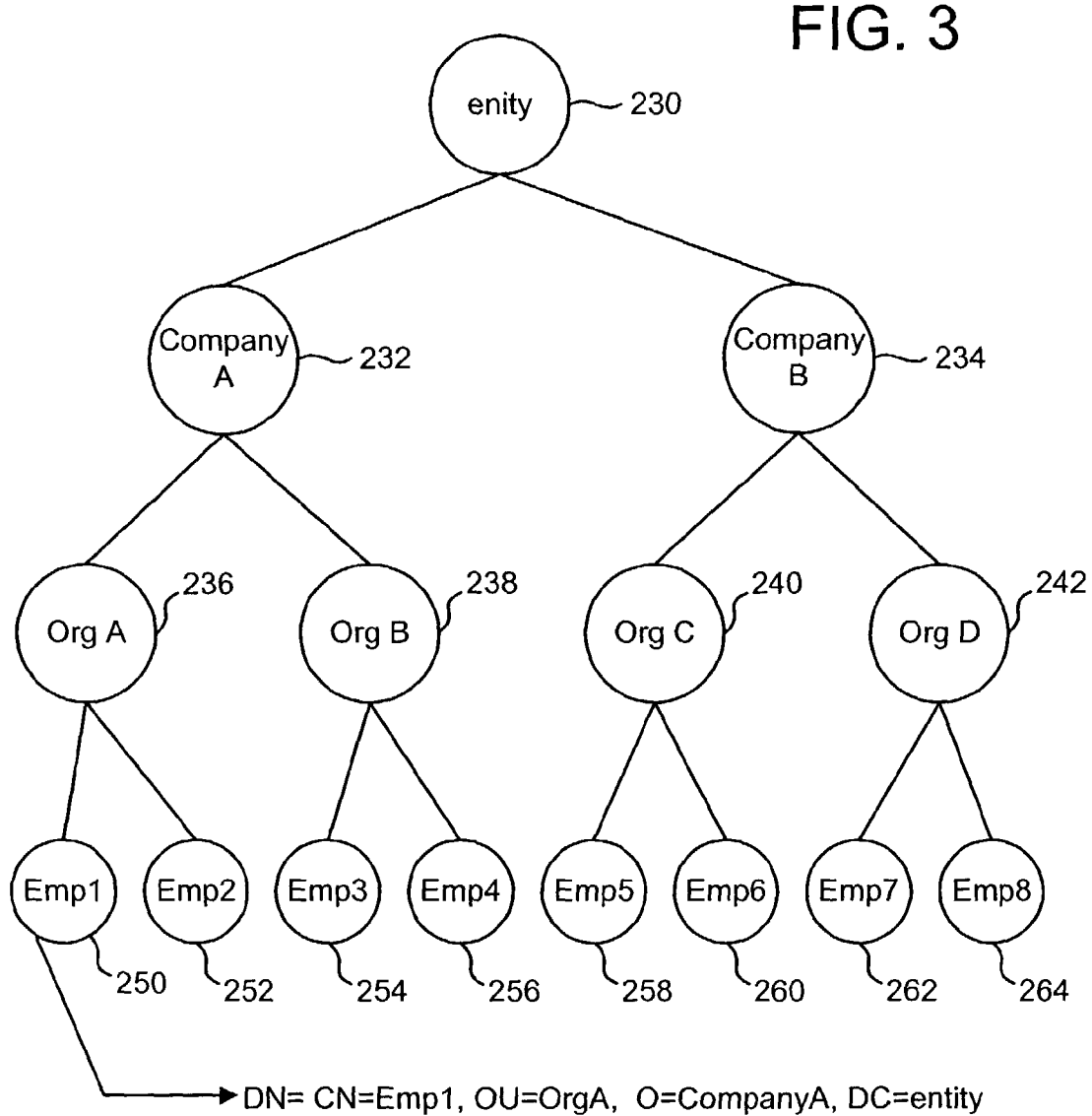
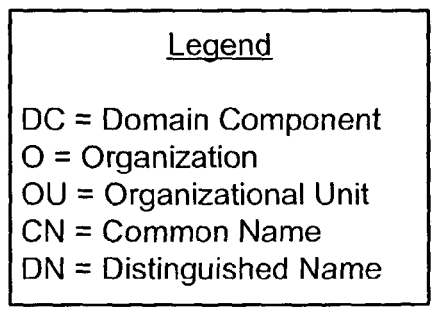

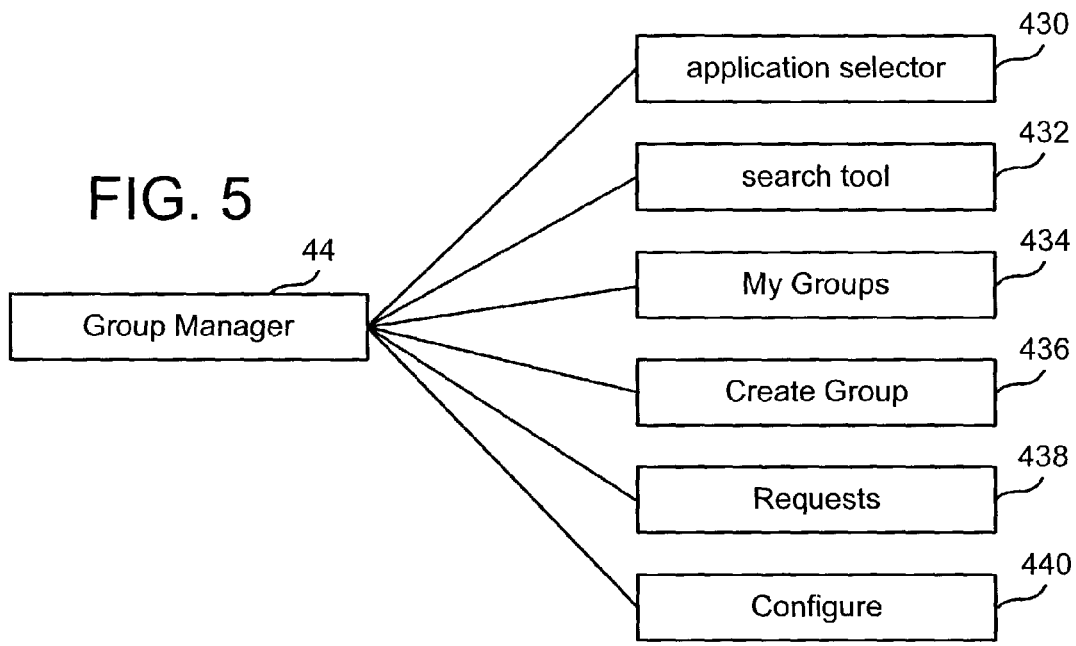
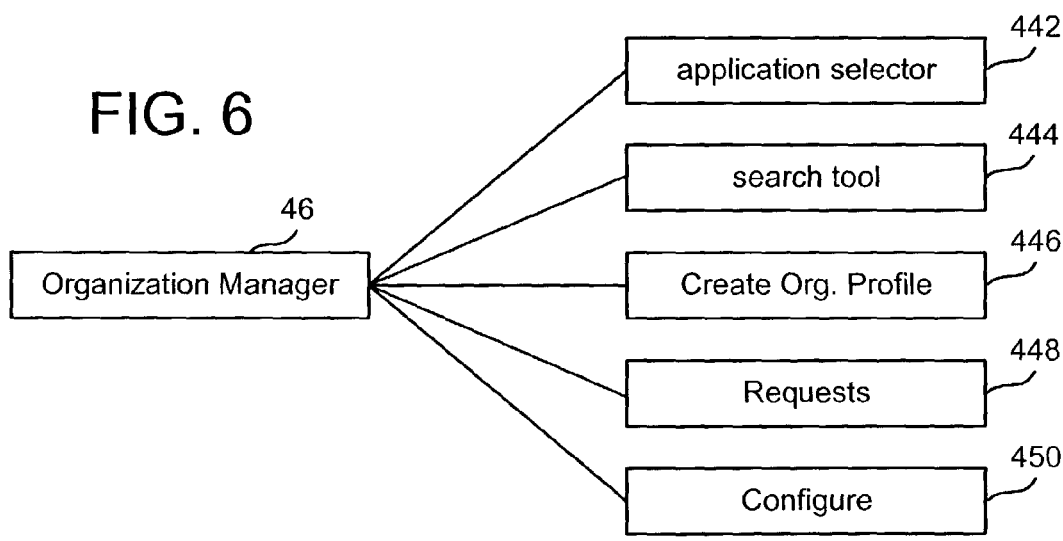

FIG. 8
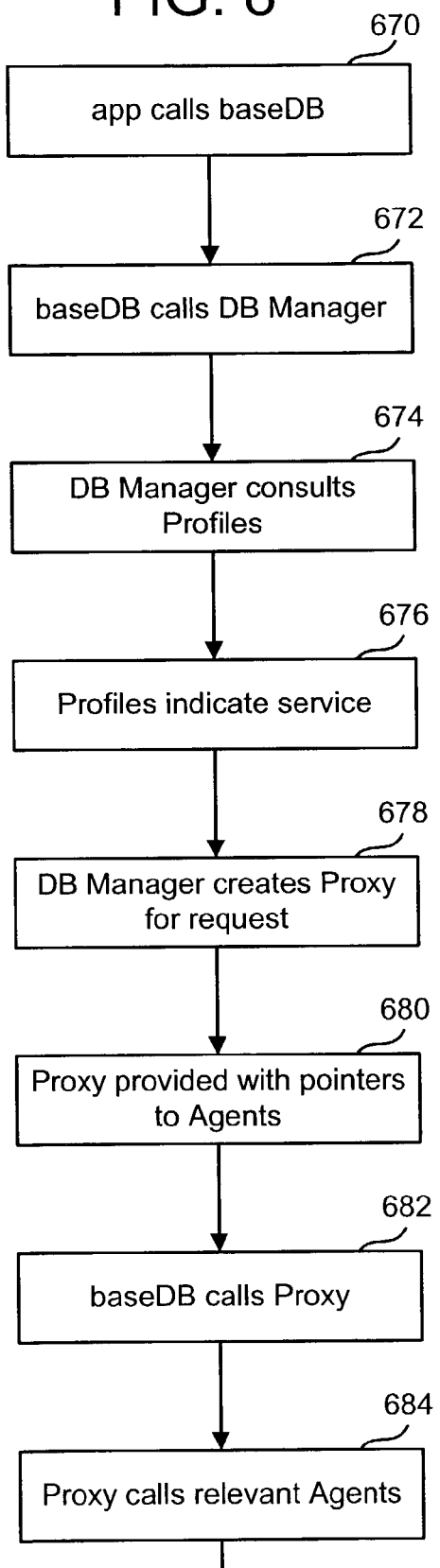
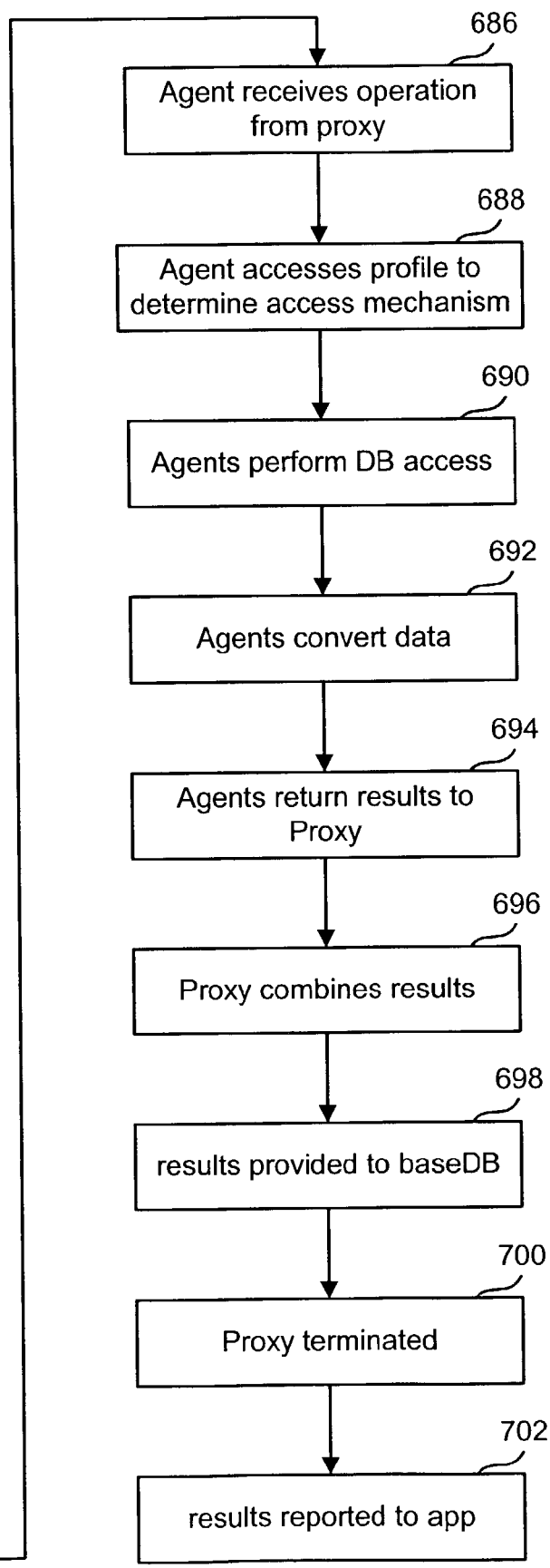

SUPPORT FOR MULTIPLE MECHANISMS FOR ACCESSING DATA STORES

This application claims the benefit of U.S. Provisional Application No. 60/395,152, "Access and Identity System," filed on Jul. 11, 2002, which is incorporated herein by reference.

CROSS-REFERENCE TO RELATED APPLICATIONS

This Application is related to U.S. patent application Ser. No. 09/998,908, "Support for Multiple Data Stores," filed on Nov. 30, 2001, which is incorporated herein by reference in its entirety.

BACKGROUND OF THE INVENTION

1. Field of the Invention

The present invention is directed to technology for supporting multiple access mechanisms for accessing data stores.

2. Description of the Related Art

With the growth of the Internet, the use of networks and other information technologies, Identity Systems have become more popular. In general, an Identity System provides for the creation, removal, editing and other managing of identity information stored in various types of data stores. The identity information pertains to users, groups, organizations and/or things. For each entry in the data store, a set of attributes are stored. For example, the attributes stored for a user may include a name, address, employee number, telephone number, email address, user ID and password. The Identity System can also manage access privileges that govern what an entity can view, create, modify or use in the Identity System. Often, this management of access privileges is based on one or more specific attributes, membership in a group and/or association with an organization.

Some Identity Systems use directories to store data. Other systems use relational databases or other types of data stores. In some cases, all of the data is maintained in one data store. However, there are cases when multiple data stores are necessary. For example, if the amount of data is too big to fit in one data store, multiple data stores may be necessary. Additionally, some entities desire a back-up or shadow data store, which stores a replica of the main data store for fault tolerance reasons.

Some users of Identity Systems also use Access Systems. An Access System provides for the authentication and authorization of users attempting to access resources. For efficiency purposes, there is an advantage to integrating the Identity System and the Access System. For example, both systems can share the same set of data stores and identity information. Additionally, integrating the Identity System and the Access System allows for single sign-on functionality across multiple resources.

There have been previous systems that have provided support for multiple data stores. The data stores are accessed using an access mechanism. An access mechanism is a system, process, protocol, set of rules, interface, etc. that provides for access to a data store. There are many different access mechanisms in use. Each access mechanism has its advantages and disadvantages.

Some prior systems allow the owner (or administrator) of the system to choose an access mechanism. However, the chosen access mechanism is then used for all operations for a data store. While it is advantageous to be able to choose an access mechanism, it may not be efficient for all operations to be performed using the same access mechanism. Because each access mechanism has its advantages and disadvantages, some operations may be better suited for one access mechanism while other operations may be better suited for a different access mechanism.

SUMMARY OF THE INVENTION

The present invention, roughly described, pertains to technology for supporting the use of multiple access mechanisms for accessing one or more data stores. Examples of access mechanisms include the LDAP protocol, the ADSI protocol and LDAP over SSL. One embodiment of the present invention includes maintaining associations of access mechanisms to types of data store operations such that two or more types of data store operations for a first data store can be associated with different access mechanisms. The system receives a first operation for the first data store, where the first operation is of a first type of data store operation. The system then accesses the first data store to perform the first operation using an access mechanism associated with the first type of data store operation. Subsequently, a second operation can be received, where the second operation is a second type of data store operation. The data store is accessed to perform the second operation using an access mechanism that is associated with the second type of data store operation. The steps of receiving and performing the second operation can be performed concurrently or serially with receiving and performing the first operation.

One example implementation of the present invention includes associations of access mechanisms to types of data store operations such that two or more types of data store operations for a first data store can be associated with different access mechanisms. The system includes an agent capable of receiving requests to perform operations of various types of data store operations and accessing the first data store using appropriate one or more access mechanisms based on the associations.

In one embodiment, the present invention includes maintaining an association of a first type of data store operation to a first access mechanism and changing that association such that the first type of data store operation is subsequently associated with a second access mechanism. After the change, the system can access the data store to perform an operation of the first type of data store operation using the second mechanism. The steps of maintaining, changing and accessing are performed by the system while the system is live. The term "live" is meant to refer to the situation when the system is operating for its intended purposes. For example, if the system is an Identity System, the system is live if it is operating for one or more users as an Identity system.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 3 is an example of a directory tree structure.

FIG. 5 is a block diagram describing the services of the Group Manager.

FIG. 6 is a block diagram describing the services of the Organization Manager.

FIG. 8 is a flow chart describing one embodiment of a process for supporting multiple data stores.

DETAILED DESCRIPTION

The present invention provides for the use of different access mechanisms for interacting with one or more data stores. In one embodiment, the level of granularity is at the level of types of operations (e.g. read, modify, etc.). The system can be configured to use one access mechanism for one or more type of operations while using other access mechanisms for other types of operations, all to the same data store or to different data stores. The present invention is not limited to any particular set of types of operations. Various uses and implementations will work with different sets of types of operations. The present invention can also be used with many different systems that use data stores. For example, the present invention can be used with an access management system. The present invention can also be used with other systems.

Figure 1:
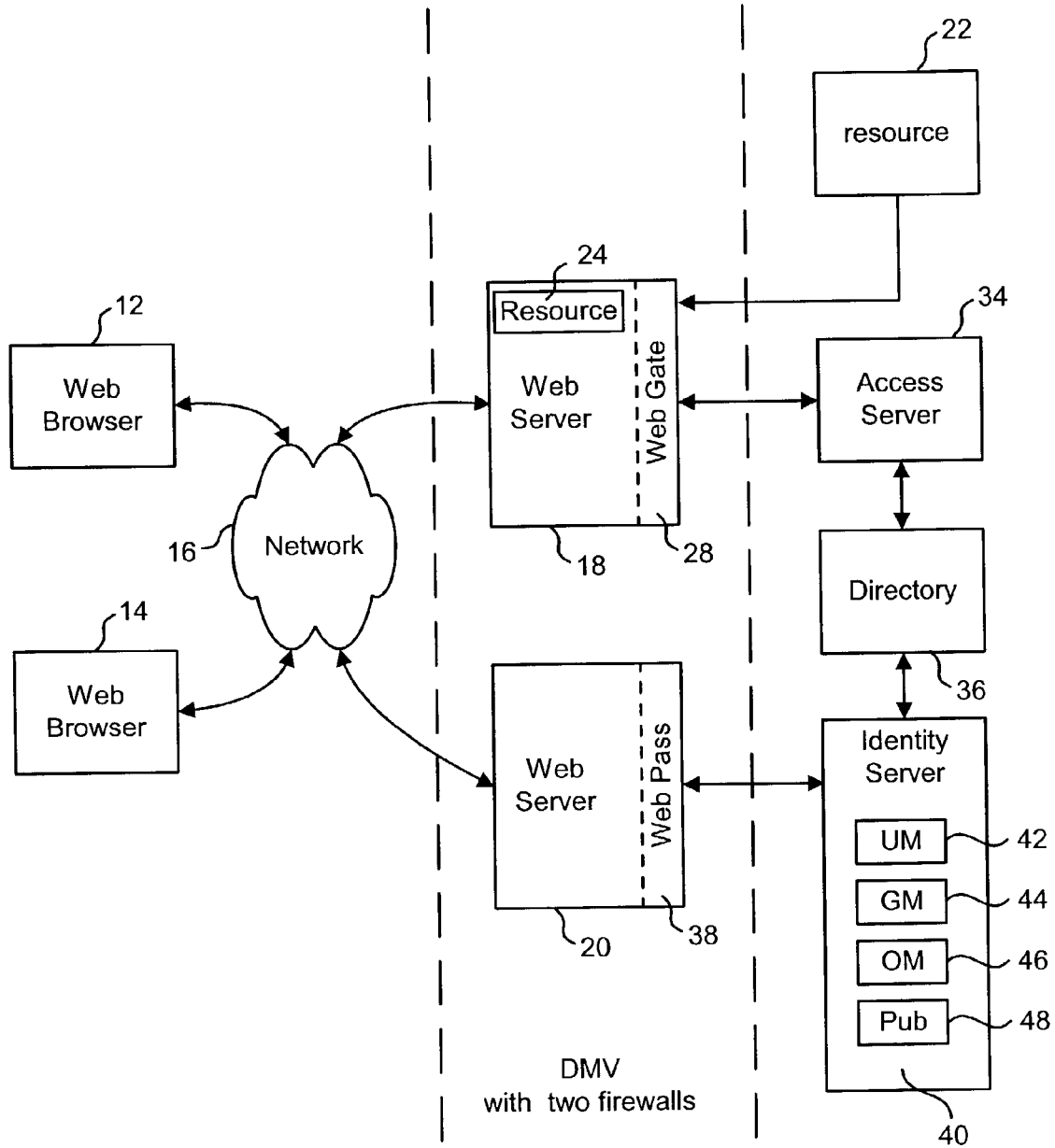
FIG. 1 is a block diagram depicting the components of one embodiment of the present invention.

FIG. 1 depicts an example of an access management system that provides identity management services and/or access management services for a network. The identity management portion of the system (hereinafter "the Identity System") manages identity profiles, while the access management portion of the system (hereinafter "the Access System") provides security for resources across one or more Web Servers (or other components). A feature of one embodiment of this system is the centralization of the repositories for policies and identity profiles, while decentralizing their administration. That is, the system centralizes the policy and identity repositories by building them on a directory service technology. The system decentralizes their administration by hierarchy delegating administrative roles. Although the system of FIG. 1 includes an Identity System and an Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see RFC 1738). A resource can include a web page, software application, file, database, directory, data unit, etc. In one embodiment, a resource is anything accessible to a user via a network. The network could be the Internet, a LAN, a WAN, or any other type of network.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory 36.

The Access System includes Access Server 34, Web Gate 28, and Directory 36. Access Server 34 provides authentication, authorization, auditing and logging services. It further provides for identity profiles to be used across multiple domains and for access based on a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory 36. Identity Server 40 manages identity profiles. An identity profile is a set of information associated with a particular entity (e.g. user, group, organization, etc.). The data elements of the identity profile are called attributes. An attribute may include a name, a value and access criteria. The Identity Server includes three main applications, which effectively handle the identity profiles and privileges of the user population: User Manager 42, Group Manager 44, and Organization Manager (also called Object Manager) 46. User Manager 42 manages the identity profiles for individual users. Group Manager 44 manages identity profiles for groups. Organization Manager 46 manages identity profiles for organizations and/or can manage any object. Identity Server 40 also includes Publisher 48, an application that enables entities to quickly locate and graphically view information stored by Directory 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Group Manager 44 allows entities to create, delete and manage groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets organizations form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations and/or other objects within an e-business network, including partners, suppliers, or even major internal organizations such as sales offices and business units. Certain infrastructure security and management operations are best handled—or can only be handled—at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The various components of FIG. 1 can be implemented by software running on computing devices. Many different types of computing devices can be used, including servers, mainframes, minicomputers, personal computers, mobile computing devices, etc. Typically, such computing devices will have one or more processors that are programmed by code that is stored in one or more processor readable storage devices. The one or more processors are in communication with the processor readable storage devices, peripherals (e.g. keyboards, monitors, pointing devices, printers, etc.) and communication interfaces (e.g. network interfaces, modems, wireless transmitters/receivers, etc.).

The system of FIG. 1 is scalable. There can be one or many Web Servers, one or many Access Servers, and one or many Identity Servers. In one embodiment, Directory 36 is a Directory Server and communicates with other servers/modules using LDAP or LDAP over SSL. In other embodiments, Directory 36 can implement other protocols or can be other types of data repositories (e.g. relational database using SQL, etc.). Many variations of the system of FIG. 1 can be used with the present invention. For example, instead of accessing the system with a web browser, an API can be used. Alternatively, portions of functionality of the system at FIG. 1 can be separated into independent programs that can be accessed with a URL.

To understand how the system of FIG. 1 protects a resource, first consider the operation of unprotected resources with a typical unprotected resource. First, an end user causes his or her browser to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information. The received log-on information is then passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory 36. If the user's supplied log-on information satisfies the authentication criteria, the process flows as described below; otherwise, the end user is notified that access to the requested resource is denied and the process halts. After authenticating the user, Web Gate 28 queries Access Server 34 about whether the user is authorized to access the resource requested. Access Server 34 in turn queries Directory 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

Figure 2:
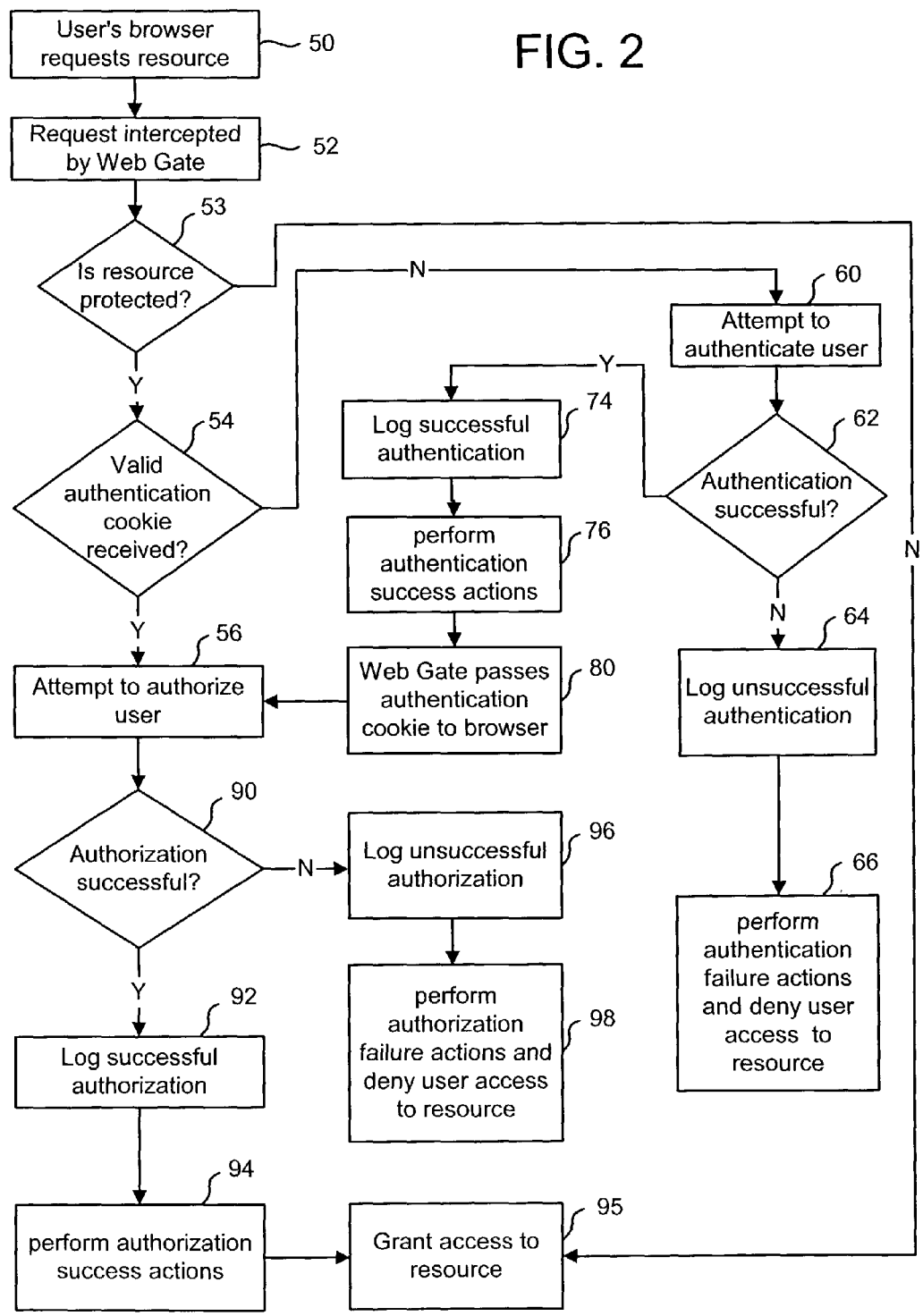
FIG. 2 is a flow chart describing one embodiment of a process for authenticating and authorizing.

FIG. 2 provides a flow chart for one embodiment of a method for authenticating and authorizing. In step 50, a user's browser 12 requests a web-enabled resource 22 or 24. The request is intercepted by Web Gate 28 in step 52. The method then determines whether the requested resource is protected by an authentication and/or authorization rule in step 53. If the resource is not protected, then access is granted to the requested resource in step 95. If the requested resource is protected, however, the method proceeds to step 54. If the user has previously authenticated for a protected resource in the same domain, a valid authentication cookie is passed by browser 12 with the request in step 50. The authentication cookie is intercepted by Web Gate in step 52. If a valid cookie is received (step 54), the method attempts to authorize the user in step 56. If no valid authentication cookie is received (step 54), the method attempts to authenticate the user for the requested resource (step 60).

If the user successfully authenticates for the requested resource (step 62), then the method proceeds to step 74. Otherwise, the unsuccessful authentication is logged in step 64. After step 64, the system then performs authentication failure actions and Web Gate 28 denies the user access to the requested resource in step 66. In step 74, the successful authentication of the user for the resource is logged. The method then performs authentication success actions in step 76. In response to the successful authentication, Web Gate 28 then passes a valid authentication cookie to browser 12 (step 80), which stores the cookie. After passing the cookie in step 80, the system attempts to authorize in step 56.

In step 56, the method determines whether the user is authorized to access the requested resource. If the user is authorized (step 90), the method proceeds to step 92. Otherwise, the unsuccessful authorization is logged in step 96. After step 96, the method performs authorization failure actions (step 98) and Web Gate 28 denies the user access to the requested resource. If authorization is successful (step 90), then the successful authorization of the user is logged in step 92. Authorization success actions are performed in step 94. The user is granted access to the requested resource in step 95. In one embodiment of step 95, some or all of HTTP request information is provided to the resource. In one or more scenarios, the resource being accessed is the Identity System.

More information about authorization, authentication, an Access System and an Identity System can be found in U.S. patent application Ser. No. 09/998,908, "Support for Multiple Data Stores," filed on Nov. 30, 2001, which is incorporated herein by reference in its entirety.

Both the Identity System and the Access System make use of Directory 36. The basic unit of information store in Directory 36 is called an entry or identity profile, which is a collection of information about an object. The information in an entry often describes a real-world object such as a person, but this is not required. A typical directory includes many entries that correspond to people, departments, groups and other objects in the organization served by the directory. An entry is composed of a set of attributes, each of which describes one particular trait of the object. Each attribute has a type, one or more values, and associated access criteria. The type describes the kind of information contained in the attribute, and the value contains the actual data.

An entry in the directory has a set of attributes that are required and a set of attributes that are allowed. For example, an entry describing a person is required to have a cn (common name) attribute and an sn (surname) attribute. One example of an allowed attribute may be a nickname. Any attribute not explicitly required or allowed is prohibited.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

FIG. 3 depicts an exemplar directory tree that can be stored in Directory 36. Each node on the tree is an entry in the directory structure that includes an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 230. Each of the companies with Extranet access would have a node at a level below node 230. For example, company A (node 232) and company B (node 234) are directly below node 230. Each company may be broken up into organizations. The organizations could be departments in the company or logical groups to help manage the users. For example, FIG. 5 shows company A broken up into two organizations: organization A with node 236 and organization B with node 238. Company B is shown to be broken up into two organizations: organization C with node 240 and organization D with node 242. FIG. 5 shows organization A having two end users: employee 1 with node 250 and employee 2 with node 252. Organization B is shown with two end users: employee 3 with node 254 and employee 4 with node 256. Organization C is shown with two end users: employee 5 with node 258 and employee 6 with node 260. Organization D is shown with two end users: employee 7 with node 262 and employee 8 with node 264.

Each entity has a distinguished name (DN), which uniquely identifies the node. In one embodiment, each entry also has a relative name, which is different from all other relevant names on the same level of the hierarchy. In one implementation, the distinguished name (DN) comprises a union of the relative names up the tree. For example, the distinguished name of employee 1 (node 250) is DN=CN=Emp1, OU=OrgA, O=CompanyA, DC=entity, where:
- DC=Domain Component
- O=Organization
- OU=Organizational Unit
- CN=common name.

FIG. 3 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity System's services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

As described above, the Identity System of FIG. 1 includes User Manager 42, Group Manager 44 and Organization Manager 46. User Manager 42 manages identity profiles for users. Group Manager 44 manages identity profiles for groups. Organization Manager 46 manages identity profiles for organizations and/or other objects. Each of these components will now be described in more detail.

Figure 4:
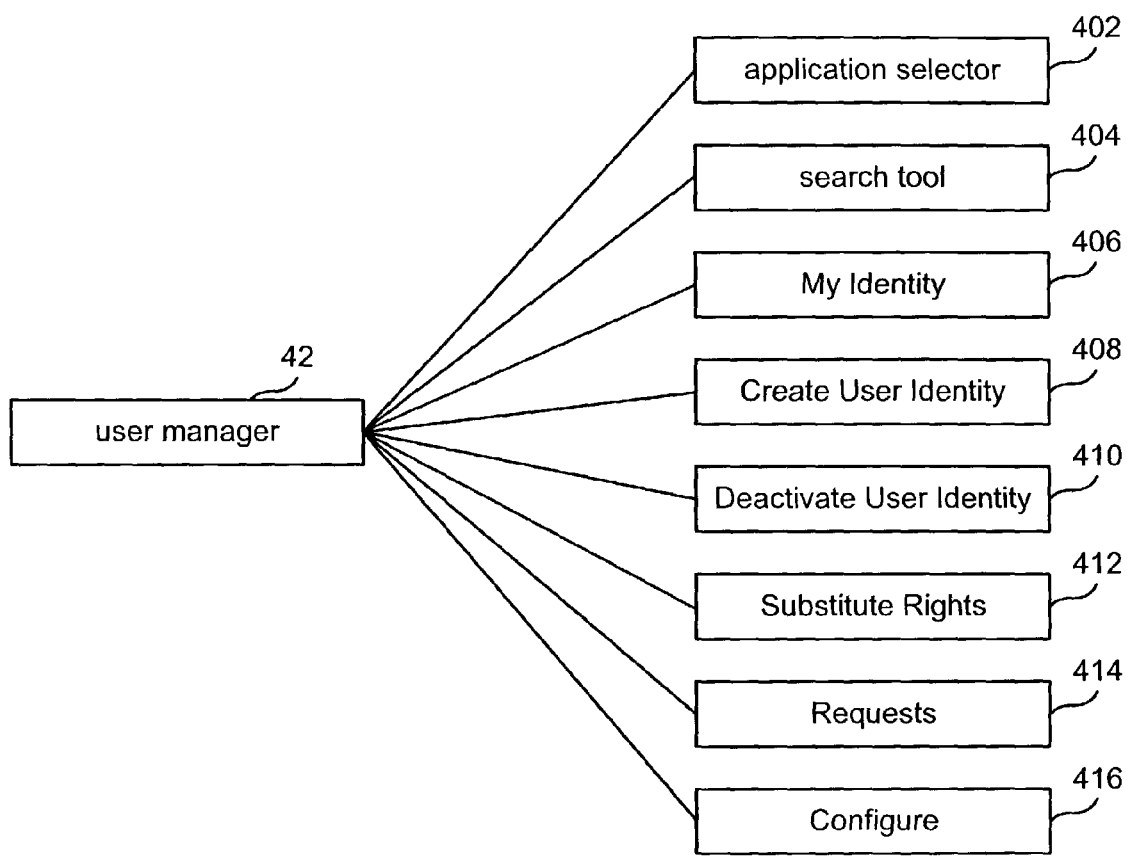
FIG. 4 is a block diagram describing the services of the User Manager.

FIG. 4 graphically depicts the various services provided by User Manager 42. Each of these services can be accessed from a User Manager home page. For example, in one embodiment, the home page will include an application selector 402, search tool 404, My Identity tab 406, Create User Identity tab 408, Deactivate User Identity tab 410, Substitute Rights tab 412, Requests tab 414 and Configure tab 416. Application selector 402 lets the user change applications from the User Manager to either the Group Manager, Object Manager or Publisher. In one embodiment, application selector 402 is a drop down menu. Search tool 404 enables a user to provide search information in order to search the directory for a set of one or more user identity profiles.

By selecting My Identity tab 406, a user is provided with the information stored in that user's identity profile. Create User Identity tab 408 allows a user with the appropriate privileges to create a new user identity profile (e.g. with a workflow). Deactivate User Identity tab 410 allows a user with proper privileges to remove an identity profile from the directory. Substitute Rights tab 412 allows the user to indicate who can proxy that user and allows the user to be a proxy for someone else. Request tab 414 allows a user to monitor workflows that are in progress or recently completed. Depending on the user's privileges, by selecting request tab 414, the user can see all workflows that involve that user, that are started by that user, that affect that user or that the user has privileges to view. Request tab 414 will indicate workflows for which there is an outstanding action to be done by the current user. The user can select that workflow and perform the task.

Configure tab 416 allows a user to configure various options for User Manger 42. The user must have sufficient privileges to access Configure tab 416. The user can perform attribute access control, delegate administration, define workflows and set the search base. Attribute access control includes controlling who has view and modify permissions for each attribute. Attributes can be set at any and all levels in an organization. The configuration also allows the specification of an e-mail notification list when a change to an attribute is requested. Delegation administration includes delegating administrative tasks to local administrators. An entity can choose what rights to delegate, whom to delegate to, and the scope to delegate. Workflow definition includes defining workflows for a particular organization, defining who will be responsible for the workflow actions and/or defining who will be receiving notifications for the workflow actions. Setting the search base includes setting the search base for a particular organization, person or set of persons. This will localize access to ensure security.

FIG. 5 depicts the various services provided by Group Manager 44. Once an entity is at the Group Manager home page, the entity can access the application selector 430, search tool 432, My Groups tab 434, Create Groups tab 436, Request tab 438 and Configure tab 440. My Groups tab 434 indicates the groups of which the entity is a member. By selecting any of the groups identified by My Groups tab 434 or Search Tool 432, the user will be provided with the identity profile page for that particular group. From the profile page, the group can be modified or deleted. Create groups tab 436 allows the user to create a new group. Request tab 438 provides the user with access to currently pending and recently finished workflows that involve groups. Configure tab 440 allows the user to configure various information about groups in the Group Manager. While viewing the identity profile for a group, the entity can modify that profile if the entity has appropriate privileges.

Configure tab 440 allows an entity to provide attribute access control, delegate rights, define workflows and expand dynamic groups. Attribute access control includes controlling who has view and modify permissions for each attribute in group identity profiles. Additionally, e-mail notification lists can be created which are used to notify entities when a change to an attribute is requested. Administration tasks can be delegated to local administrators. An entity can choose what rights to delegate, who to delegate to, and what the scope of the delegation is. Workflow definition includes defining the workflows for a particular group. This includes defining who is responsible for the workflow actions and who will be receiving notifications for workflow actions. Note that some of the tabs and services may not be available to all entities, depending upon the privileges of those entities.

FIG. 6 depicts the services provided by Organization Manager 46. Organization manager 46 provides functionality to create, modify, delete and manage organizational objects. From the home page for Organization Manager 46, a user is provided with an application selector 442, search tool 444, Create Organizational Profile tab 446, Request tab 448 and Configure tab 450. Application selector 442 allows the user to select a different application to access. Search tool 444 provides a user with the ability to enter search terms in order to search for one or more organizational objects. After performing a search, the user will be provided with a list of organizational objects meeting the search requirements. User can select any of these objects to view, modify or delete, if the user has sufficient privileges.

Create Organizational Profile tab 446 allows a user to create new organizational objects, if the user has sufficient privileges. Request tab 448 allows a user to access pending workflows and workflows that have recently been finished that relate to organizational objects. Access to Request tab 448 can be restricted and/or limited depending upon users privileges. If a user has a step to perform for a workflow, it will be indicated by Request tab 448.

Configure tab 450 allows the entity to perform attribute access control, delegate administration, define workflows and define container limits. Attribute access control includes controlling who has view and modify permissions for each attribute of an organizational identity profile. In addition, an entity can specify an e-mail notification list when a change to an attribute is requested. Delegating administration includes delegating administrative tasks to local administrators. An entity can choose what rights to delegate, whom to delegate to, and the scope of the delegation. Workflow definition includes defining the workflows for a particular organization, including who will be responsible for the workflow actions and who will be receiving notifications for the workflow. Container limits includes controlling how many objects can be created in an organization. This would also include defining who will be receiving notifications that a container limit has been met, has been violated or is close to being met.

Figure 7:
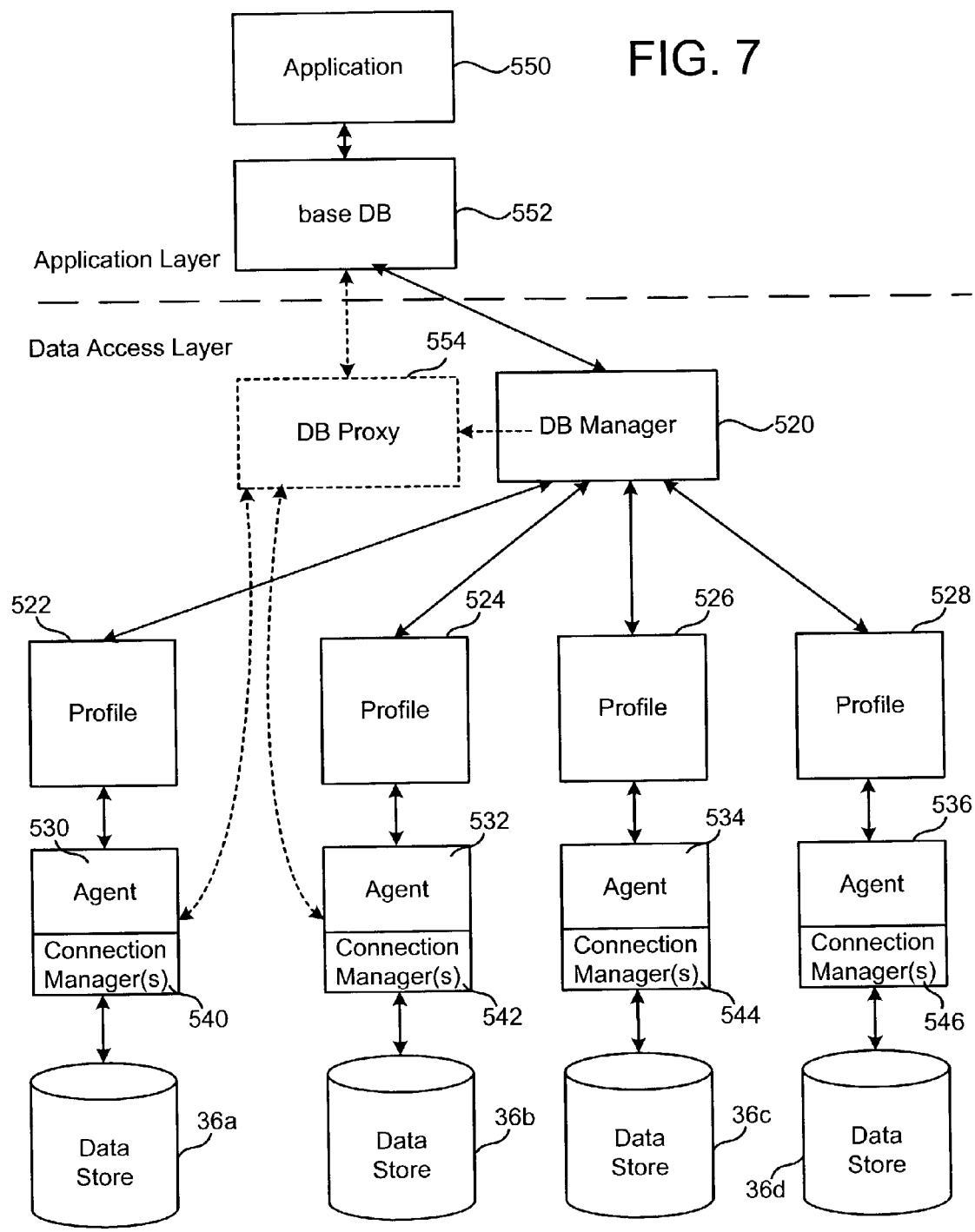
FIG. 7 is a block diagram depicting one embodiment of the present invention that supports multiple data stores.

FIG. 1 shows Identity Server 40 communicating with Directory 36. The system can support multiple data stores (directories or other types of data stores) and multiple access mechanisms for using those data stores. FIG. 7 depicts an exemplar architecture for supporting multiple data stores and multiple access mechanisms based on the notion of abstracting database objects and separating database clients from the actual database access functionalities. By doing so, clients can be implemented in a database independent fashion. Additionally, multiple access mechanisms allows users of the system to tune the system at an operation by operation granularity to use the access mechanism most suited for each operation.

Database manager 520 is the central place where all database clients interface to access the data stores. In one embodiment, there is one database manager 520 for all clients. When database manager 520 starts, it will read the directory server configuration file(s) and insert corresponding profile and agent objects to its internal tables for later reference. FIG. 7 shows database manager 520 in communication with profiles 522, 524, 526 and 528. Each profile corresponds to an agent. For example, profile 522 corresponds to agent 530, profile 524 corresponds to agent 532, profile 526 corresponds to agent 534, and profile 528 corresponds to agent 536. Each agent is associated with one or more connection managers and a data store. For example, agent 530 is associated with connection manager(s) 540 and data store 36a. Agent 532 is associated with connection manager(s) 542 and data store 36b. Agent 534 is associated with connection manager(s) 544 and data store 36c. Agent 536 is associated with connection manager(s) 546 and data store 36d. In one embodiment, each of the data stores are directory servers. In other embodiments, one or more of the data stores are directories accessed using LDAP and one or more of the data stores are other types of data stores (e.g. SQL servers). In some implementations, none of the data stores use LDAP. In some embodiments, one or more data stores can use multiple access mechanisms. When a data store uses multiple access mechanisms, there will be a connection manager for each access mechanism.

Each of the profiles (522, 524, 526 and 528) represents configuration information for the associated data store. This includes, among other things, host name, port number, name space, login name (also called an ID), password and supported operations. There is a one-to-one mapping between a profile and agent. One of the most important methods exposed by a profile is the method "IsSupported." Database manager 520 calls this method to determine whether a proposed data store access request can be performed by the data store associated with the profile. The method will return a false if any of the following are met: (1) the configured profile is not enabled, (2) the database type of the access request is not the same as the data store for that profile, (3) the type of operation is not supported by the data store, (4) the target user identification has no overlap with the profile's (and data store's) name space, or (5) the target's user identification is above the profile's (and data store's) name space and the target operation is not SEARCH.

The profiles store information about which access mechanism to use for the various operations. One embodiment of the present invention allows for the performance of the following operations with respect to a data store: read, modify, delete, search, authenticate and password change. Some embodiments will uses less than all those operations listed and other embodiments may use additional operations. The profile will store an indication of which access mechanism to use when performing the each of above listed operations. Table 1, below, provides one example of the information stored in a profile for indicating the access mechanisms.

TABLE 1

| types of operations | access mechanism |
|---|---|
| read | LDAP |
| modify | LDAP |
| delete | LDAP |
| search | LDAP |
| authenticate | ADSI |
| password change | LDAP over SSL |

The selection of access mechanisms indicated in Table 1 is for example purposes only. Other selections can also be made, such as using ADSI for password change, using ADSI for read, using LDAP over SSL for authentication, etc. The user can specify any combination desired. Access mechanisms other than ADSI, LDAP and LDAP over SSL can also be used. Additional access mechanisms could include ODBC for RDBMS's. Other access mechanisms could include different implementations of the LDAP protocol. Different implementation libraries are available for LDAP such as Netscape SDK, OpenLDAP and Microsoft's winldap. Additionally, when specifying protocols such as LDAP and ADSI, a mode can be specified such as secure, not secure, or other modes. While the examples above pertain to directories, the present invention can also be used with databases (e.g. relational database) and other data stores, alone or in combination. Additional examples of access mechanisms for databases are ODBC, JDBC, ADO, OCI (for Oracle ) etc. Each RDBMS has a native access mechanism that could also be supported.

In one embodiment, a graphical user interface (GUI) is used to access and modify the profile. One example is a web based GUI that uses a web browser. In other embodiments, other types of GUIs can also be used. Additionally, the profile can be changed by means other than a GUI; for example, a software process can make the change, or the change can be made via a command line, an API, a configuration file, etc. One advantage of a GUI is that the settings indicating which operation uses which access mechanism can be changed during live operation of the Identity System, Access System, or other system. Other options for changing the profile may also allow for changes during live operation. The profile can be stored as an XML file, a list file, an object, a combination of the above, or in a different manner. In one embodiment, the profile is stored in the associated data store (or a different data store). Once the profile is configured and stored, it will continue to maintain the associations of access mechanisms to types of data store operations.

Table 1 provides examples of access mechanisms to be used for operations in conjunction with an Identity System. An Access System (integrated or stand alone) can use the operations above, a subset of the operations above or additional/different operations. Additionally, the Access portion of an integrated Access/Identity System may also be configured to use different access mechanisms for the operations listed above. That is, ADSI may be used for authentication by the Identity System while LDAP over SSL is used for authentication by the Access System.

The Agent is the object responsible for all the interaction with the data stores, for example, an agent can be used to access data or one or more attributes in identity profiles. Each agent includes one or more connection managers, which maintain the connection with the associated data store. The agents are responsible for converting the native data store entries to the format expected by the application. In one embodiment, a connection manager is a library of functions, routines, methods, objects, etc., that enable communication using a particular access mechanism. Thus, if an agent needs to use three access mechanism, it will load three libraries three connection managers, one for each access mechanism. In other embodiments, one library can be used for multiple access mechanisms. The libraries can be loaded at start-up, run time, when the profile is configured, or at other suitable times.

Database clients (e.g. Application 550) interact with database manager 520 to accomplish any database operation. Database manager 520, in turn, interacts with the profiles to determine which data stores can service the database operation. A database proxy 554 is created to service a particular database request. Database proxy 554 communicates directly to the Agents for the data stores that can service the request. The database client then interacts directly with proxy 554 to access the appropriate data stores. Thus, database proxy 554 is a dynamic object which database manager 520 creates every time a database request is made.

Database proxy 554 encapsulates the supporting agent objects for the particular operation. It also acts as a storage area where input parameters and output results are stored. Each database proxy object exposes its methods and input parameters. These parameters include search base, object class, auxiliary class, filter, search scope, attributes and entry. After a database client sets all the parameters, the client calls the execute method of the proxy to invoke the database operation. The client then calls the database proxy GetResults method to retrieve the operations results.

FIG. 7 shows database proxy 554 in dotted lines to indicate that it is created for a particular request. When the request is completed, the proxy is terminated. The proxy communicates directly with the appropriate agents for accessing the appropriate data stores. FIG. 7 shows one example of a database proxy being created to access data in data stores 36a and 36b.

FIG. 8 is a flowchart describing one embodiment of a process for performing a data operation according to the present invention. In step 670, application 550 calls baseDB 552. Application 550 can be User Manager 42, Group Manager 44, Organization Manager 46, the Access System, other applications, etc. BaseDB 552 is an object used by application 550 to access a data store. In one embodiment, baseDB 552 includes subobjects and there is one sub-object for each application. The application is calling baseDB in order to perform an operation, such as modifying an attribute in an identity profile, authenticating a specific user or reading certain data. An application can issue a request that includes one operation or a request that includes multiple operations that use different access mechanisms.

BaseDB 152 calls database manager 520 in step 672, indicating the operation and search base for the data operation. In step 674, database manager 520 consults each of the profiles to determine which data store can support the operation. That is, each data store is a particular type of data store, has its own set of operations that it supports, and has its own search base that it supports. In step 676, each of the profiles indicates whether they can service the request based on whether the above mentioned criteria match the request. In step 678, database manager 520 creates proxy 554. Note that proxy 554 is for this one particular request and will be terminated at the end of the request.

In one example, it is assumed that profiles 522 and 524 indicate that their associated data stores can service the operation, but profiles 526 and 528 report that their associated data stores cannot service the operation. Therefore, proxy 554 will be set up to communicate with agents 530 and 532, as depicted in FIG. 7.

In step 680, proxy 554 is provided with pointers to the appropriate agents, as depicted in FIG. 7. In step 682, baseDB 552 calls proxy 554 to indicate the one or more data store access operations requested. In step 684, proxy 554 communicates the appropriate data store access operation(s) to the appropriate agents. In step 686, the appropriate Agent (or Agents) receives the operation(s) from the proxy. In some embodiments, more than one operation will be received. In step 688, the agent (or agents) accesses the profile (or profiles) to determine which access mechanism to use for the received operation. For example, looking at Table 1 from above, if the received operation is to change the password for a user with the distinguished name dn =CN=Emp1, OU=OrgA, O=CompanyA, DC=entity, then the agent will access the profile and determine that password change operations use LDAP over SSL. In step 690, the agent performs the operation using the appropriate connection manager. There will be a connection manager for each access mechanism. The agent will use the appropriate connection manager associated with the access mechanism for the operation. Thus, in the example above, the agent will use the connection manager for LDAP over SSL.

In step 692, the agent (or agents) converts the data from the native format of the data store to the format expected by application 550. That is, some of the operations will return data. This returned data is converted to a format expected by application 550. Note that when the access to the data stores includes a read operation, the reporting of results will likely include the data that was read. If the access was for a write operation, the reporting of results can include a confirmation of the write operation or a reporting of the data that was written. In some embodiments, the failure to notify of an error during a write operation can be considered as reporting a successful result of the write operation. In some embodiments, data is not returned and/or conversion is not necessary.

In step 694, each of the agents returns its results to proxy 554. In step 696, proxy 554 combines the results from the various data stores into one set of results. In one embodiment, step 696 is skipped and the results are not combined. In step 698, the results are then provided to userDB 552. In step 700, database proxy 554 is terminated. In step 702, the results are reported back to application 550. With the process of FIG. 8, application 550 is insulated from the data access layer (which includes database proxy, database manager and any other components below the database manager 520, as depicted in FIG. 7). Thus, application 550 may have no knowledge of which access mechanisms are used.

Figure 9:
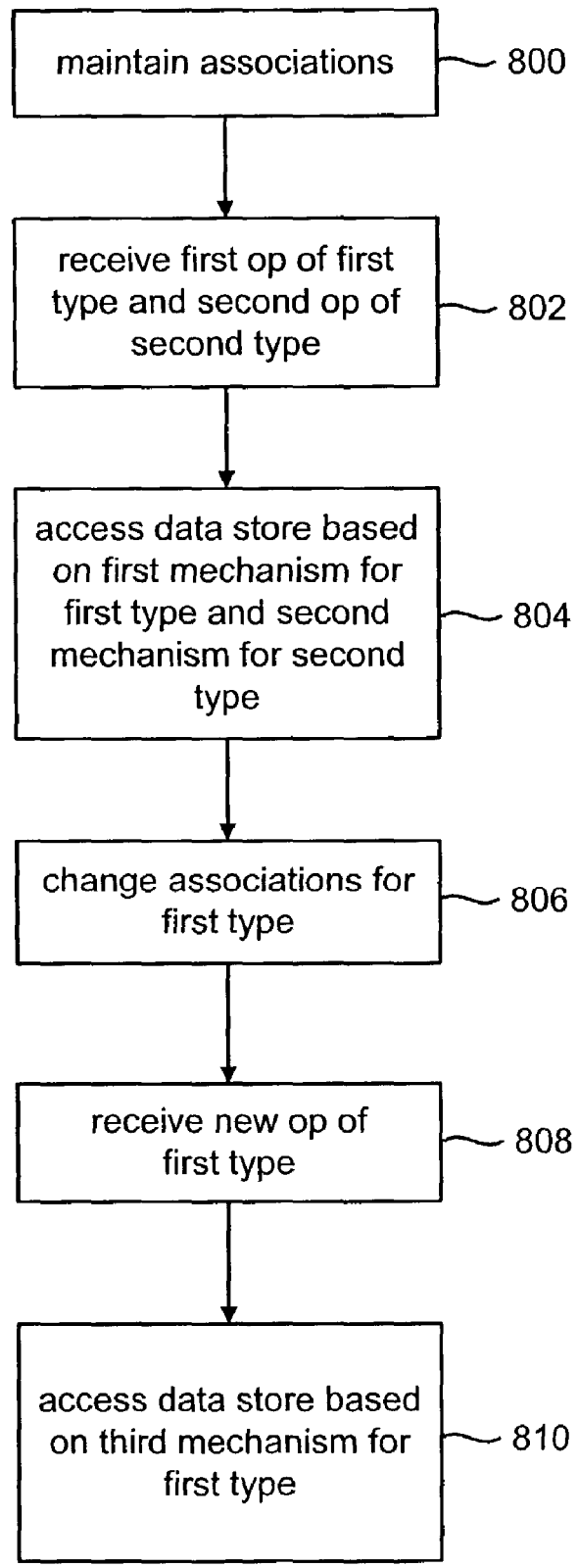
FIG. 9 is a flow chart describing on embodiment of a process of using and changing associations of access mechanisms.

FIG. 9 is a flow chart describing one embodiment of a process for using and changing associations of access mechanisms. In step 800, the system maintains in the profiles the associations of access mechanisms to types of operations, as described above. At some point, in step 802, the appropriate agent receives a first operation and a second operation. The first operation is of a first type (e.g. read) and the second operation is of a second type (e.g. modify). In step 804, the data store is accessed using a first access mechanism (e.g. LDAP) for the first operation and a second access mechanism (e.g. ADSI) for the second operation. In step 806, the associations of access mechanisms to types of operations are changed. For example, a user makes use of a GUI to change the profile so that a third access mechanism is now associated with the first type of operation. In step 808, a new operation is received by the agent. The new operation is of the first type of operation (e.g. read). In step 810, the data store is accessed using the third access mechanism for the new operation. In one embodiment, the process of FIG. 9 is performed during live operation of the system.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of using multiple access mechanisms to communicate with a data store using a computing device, the computing device including a processor and a processor readable storage device, the method comprising:

the data store maintaining two or more profiles, the profile associated with a data store, for containing associations of one or more data store operations with the data store and containing associations of access mechanisms to types of data store operations such that two or more types of data store operations for a first data store can be associated with a plurality of different access mechanisms, the plurality of access mechanisms comprising a first access mechanism that is associated with a first type of data store operation and a second access mechanism that is associated with a Second type of data store operation, the first access mechanism providing a first interface for accessing the first data store, the first interface comprising a first access protocol;

the processor receiving a first operation for the first data store, the first operation is of the first type of data store operation;

the processor calling the profile associated with the first data store to determine whether the first data store can perform the first type of data store operation;

the processor determining from the profile that the first access mechanism is associated with the first operation;

the processor accessing the first data store to perform the first operation using the first access mechanism;

the processor accessing the first data store to perform the second operation using the second access mechanism; and the processor providing the results of the first operation.

2. A method according to claim 1, wherein:
the first access protocol is Lightweight Directory Access Protocol ("LDAP").

3. A method according to claim 1, wherein:
the first access protocol is Lightweight Directory Access Protocol ("LDAP") over Secure Sockets Layer ("SSL").

4. A method according to claim 1, wherein:
the first access protocol is Active Directory Services Interface ("ADSI").

5. A method according to claim 1, wherein:
the first type of operation is a modify operation.

6. A method according to claim 5, wherein:
the first operation is an attempt to modify a specific attribute in a user profile.

7. A method according to claim 1, wherein:
the first data store is used to store identity profiles.

8. A method according to claim 1, wherein:
the steps of maintaining, receiving and accessing are performed as part of an identity system.

9. A method according to claim 1, wherein:
the steps of maintaining, receiving and accessing are performed as part of an access system.

10. A method according to claim 1, wherein:
the steps of maintaining, receiving and accessing are performed as part of an integrated access system and identity system.

11. A method according to claim 1, wherein:
the step of maintaining includes maintaining association of access mechanisms to types of data store operations for multiple data stores capable of utilizing multiple access mechanisms.

12. A method according to claim 1, wherein:
the first operation is received as part of a first access request, the first access request includes multiple operations of different types of data store operations associated with different access mechanisms.

13. A method according to claim 1, further comprising the step of:
changing the association of access mechanisms to types of data store operations, the steps of maintaining, changing and accessing are performed by a system while the system is live.

14. A method according to claim 1, further comprising the step of:
receiving a second operation for the first data store, the second operation is of a second type of data store operation; and
accessing the first data store to perform the second operation using the second access mechanism associated with the second type of data store operation.

15. A method according to claim 14, wherein:
the steps of receiving a second operation and accessing the first data store to perform the second operation are performed concurrently with the steps of receiving a first operation and accessing the first data store to perform the first operation.

16. A method according to claim 15, further comprising the step of:
changing the association of access mechanisms to types of data store operations, the steps of maintaining, changing and accessing are performed by a system while the system is live, the first data store is used to store identity profiles.

17. A method of using multiple access mechanisms to communicate with a data store using a computing device, the computing device including a processor and a processor readable storage device, the method comprising the steps of:
the data store maintaining a profile, the profile associated with the data store, wherein the profile associates a first type of operation with a first mechanism for accessing a first data store and associates a second type of operation with a second mechanism for accessing the first data store, the first access mechanism provides a first interface for accessing the first data store, the first interface comprising a first access protocol, and the second access mechanism providing second interface for accessing the first data store, the second interface comprising a second access protocol;
the processor receiving a first operation and a second operation, the first operation is of a first type of operation, the second operation is of the second type of operation;
the processor calling the profile to determine the first access mechanism is associated with the first operation and the second access mechanism is associated with the second operation;
the processor accessing the first data store to perform the first operation using the first access mechanism;
the processor accessing the first data store to perform the second operation using the second access mechanism; and
the processor providing the results of the first operation and the second operation.

18. A method according to claim 17, wherein:
the steps of receiving, accessing the first data store to perform the first operation and accessing the first data store to perform the second operation are performed as part of an identity system.

19. A method according to claim 17, wherein:
the steps of receiving, accessing the first data store to perform the first operation and accessing the first data store to perform the second operation are performed as part of an access system.

20. A method according to claim 17, wherein:
the steps of receiving, accessing the first data store to perform the first operation and accessing the first data store to perform the second operation are performed as part of an integrated access system and identity system.

21. A system, having a processor and memory, the processor capable of using multiple access mechanisms to communicate with a data store, the processor executing components, the components comprising:
a profile, stored in the memory and accessed by the processor, the profile having one or more associations of access mechanisms to types of data store operations such that a first access mechanism is associated with a first type of data store operation and a second access mechanism is associated with a second type of data store operation, the first access mechanism providing a first interface for accessing the first data store, the first interface comprising a first access protocol;
a database manager, the database manager operable to call the profile to determine whether the data store can perform the data store operation, the database manager operable to determine an agent to forward data store operations;
a database proxy, the database proxy created by the database manager, the database proxy operable to interact with the agent determined by the database manager; and
the agent, executable by the processor, capable of receiving requests to perform operations of various types of data store operations and accessing the first data store using appropriate one or more access mechanisms based on the associations.

22. A system according to claim 21, wherein:
the agent is used to access identity profiles stored on the first data store.

23. A system according to claim 21, wherein:
the associations are maintained for an identity system.

24. A system according to claim 21, wherein:
the associations are maintained for an access system.

25. A system according to claim 21, wherein:
the associations are maintained for an integrated access system and identity system.

26. A system according to claim 21, wherein:
the associations includes associations of access mechanisms to types of data store operations for multiple data stores capable of utilizing multiple access mechanisms.

27. A system according to claim 21, wherein:
the associations can be changed while the agent is live.

28. A system according to claim 27, wherein:
the associations are maintained for an integrated access system and identity system.

29. An apparatus, comprising:
one or more storage devices having processor readable code embodied on the processor readable storage devices, the processor readable code for programming one or more processors; and
one or more processors in communication with the one or more storage devices, the processor executable code comprising:
code for maintaining two or more profiles, the profile associated with a data store, for containing associations of one or more data store operations with the data store and containing associations of access mechanisms to types of data store operations such that two or more types of data store operations for a first data store can be associated with a plurality of different access mechanisms, the plurality of access mechanisms comprising a first access mechanism that is associated with a first type of data store operation and a second access mechanism that is associated with a second type of data store operation, the first access mechanism providing a first interface for accessing the first data store, the first interface comprising a first access protocol;
code for receiving a first operation for the first data store, the first operation is o the first type of data store operation;
code for calling the profile associated with the first data store to determine whether the first data store can perform the first type of data store operation;
code for determining from the profile that the first access mechanism is associated with the first operation;
code for accessing the first data store to perform the first operation using an access mechanism;

code for accessing the first data store to perform the second operation using the second access mechanism; and code for providing the results of the first operation.

30. An apparatus according to claim 29, wherein:

the code for maintaining includes code for maintaining associations of access mechanisms to types of data store operations for multiple data stores capable of utilizing multiple access mechanisms.

31. An apparatus according to claim 29, wherein the processor readable code further comprises:

code for changing the associations of access mechanisms to types of data store operations, the code for maintaining, changing and accessing are performed by the system while the system is live.

32. One or more processor readable storage devices having processor readable code embodied on the processor readable storage devices, the processor readable code for programming one or more processors and comprising:

code for maintaining one or more profiles containing associations of one or more data store operations with the data store and containing associations of access mechanisms to types of data store operations such that two or more types of data store operations for a first data store can be associated with a plurality of different access mechanisms, the plurality of access mechanisms comprising a first access mechanism that is associated with a first type of data store operation and a second access mechanism that is associated with a second type of data store operation, the first access mechanism providing a first interface for accessing the first data store, the first interface comprising a first access protocol;

code for receiving a first operation for the first data store, the first operation is of the first type of data store operation;

code for calling the profile associated with the first data store to determine whether the first data store can perform the first type of data store operation;

code for determining from the profile that the first access mechanism is associated with the first operation;

code for accessing the first data store to perform the first operation using an access mechanism; and code for providing the results of the first operation.

33. One or more processor readable storage devices according to claim 32, wherein:

the first data store is used to store identity profiles.

34. One or more processor readable storage devices according to claim 32, wherein:

the processor readable code is performed by an identity system.

35. One or more processor readable storage devices according to claim 32, wherein:

the processor readable code is performed by an access system.

36. One or more processor readable storage devices according to claim 32, wherein:

the processor readable code is performed by an integrated access system and identity system.

37. One or more processor readable storage devices according to claim 32, wherein:

the code for of maintaining includes code for maintaining associations of access mechanisms to types of data store operations for multiple data stores capable of utilizing multiple access mechanisms.

38. One or more processor readable storage devices according to claim 32, wherein the processor readable code further comprises:

code for changing the association of access mechanisms to types of data store operations, the steps of maintaining, changing and accessing are performed by a system while the system is live.

39. One or more processor readable storage devices having processor readable code embodied on the processor readable storage devices, the processor readable code for programming one or more processors, the processor readable code capable of being used to create a system capable of using multiple access mechanism to communicate with a data store, the system comprising:

a profile, stored in the readable storage devices and accessed by the processor, the profile having one or more associations of access mechanisms to types of data store operations such that a first access mechanism is associated with a first type of data store operation and a second access mechanism is associated with a second type of data store operation, the first access mechanism providing a first interface for accessing the first data store, the first interface comprising a first access protocol;

a database manager, the database manager operable to call the profile to determine whether the data store can perform the data store operation, the database manager operable to determine an agent to forward data store operations;

a database proxy, the database proxy created by the database manager, the database proxy operable to interact with the agent determined by the database manager; and the agent, executable by the processor, capable of receiving requests to perform operations of various types of data store operations and accessing the first data store using appropriate one or more access mechanisms based on the associations.

40. One or more processor readable storage devices according to claim 39, wherein:

the agent is used to access identity profiles stored on the first data store.

41. One or more processor readable storage devices according to claim 39, wherein:

the associations are maintained for an identity system.

42. One or more processor readable storage devices according to claim 39, wherein:

the associations are maintained for an access system.

43. One or more processor readable storage devices according to claim 39, wherein:

the associations are maintained for an integrated access system and identity system.

44. One or more processor readable storage devices according to claim 39, wherein:

the associations includes associations of access mechanisms to types of data store operations for multiple data stores capable of utilizing multiple access mechanisms.

45. One or more processor readable storage devices according to claim 39, wherein:

the associations can be changed while the agent is live.

46. A method according to claim 1, wherein maintaining associations of access mechanisms to types of data store operations comprises:

maintaining a profile for the first data store; and storing in the profile the associations of access mechanisms to types of data store operations.

47. A method according to claim 17, wherein the first operation comprises an authentication operation, and wherein the second operation comprises an authorization operation.

48. A method according to claim 47, wherein the access protocol is Active Directory Services Interface ("ADSI"), and wherein the second access protocol is Lightweight Directory Access Protocol ("LDAP").

* * * * *

UNITED STATES PATENT AND TRADEMARK OFFICE
CERTIFICATE OF CORRECTION

PATENT NO. : 7,512,585 B2 Page 1 of 1
APPLICATION NO. : 10/314888
DATED : March 31, 2009
INVENTOR(S) : Agarwal et al.

It is certified that error appears in the above-identified patent and that said Letters Patent is hereby corrected as shown below:

On page 3, in column 2, under "Other Publications", line 24, delete "Diistributed" and insert -- Distributed --, therefor.

On page 3, in column 2, under "Other Publications", line 25, delete "Coputer" and insert -- Computer --, therefor.

On page 3, in column 2, under "Other Publications", line 53, delete "Verson" and insert -- Version --, therefor.

In column 1, lines 7-8, delete "CROSS-REFERENCE TO RELATED APPLICATIONS" and insert the same as a new paragraph at the beginning of column 1, line 3.

In column 12, line 63, delete "(for Oracle )" and insert -- (for Oracle) --, therefor.

In column 13, line 36, after "libraries" insert -- — --.

In column 14, line 10, delete "subobjects" and insert -- sub-objects --, therefor.

In column 15, line 64, in claim 1, delete "Second" and insert -- second --, therefor.

In column 17, line 23, in claim 17, after "providing" insert -- a --.

In column 18, line 59, in claim 29, delete "o" and insert -- of --, therefor.

In column 19, line 61, in claim 37, delete "for of" and insert -- for --, therefor.

Signed and Sealed this

Twenty-fifth Day of May, 2010

David J. Kappos
*Director of the United States Patent and Trademark Office*